(12) United States Patent
Dellock et al.

(10) Patent No.: US 11,020,941 B2
(45) Date of Patent: Jun. 1, 2021

(54) METHOD OF MANUFACTURING A LIGHTWEIGHT VEHICLE WINDOW GLASS ARTICLE

(71) Applicant: FORD MOTOR COMPANY, Dearborn, MI (US)

(72) Inventors: Paul Kenneth Dellock, Northville, MI (US); Thomas F Boettger, Dearborn, MI (US); Talat Karmo, Waterford, MI (US); Stuart C. Salter, White Lake, MI (US); Michael Musleh, Canton, MI (US)

(73) Assignee: FORD MOTOR COMPANY, Dearborn, MI (US)

( * ) Notice: Subject to any disclaimer, the term of this patent is extended or adjusted under 35 U.S.C. 154(b) by 372 days.

(21) Appl. No.: 15/221,776

(22) Filed: Jul. 28, 2016

(65) Prior Publication Data

US 2018/0029265 A1    Feb. 1, 2018

(51) Int. Cl.
| | |
|---|---|
| B29C 45/16 | (2006.01) |
| B32B 25/08 | (2006.01) |
| B32B 27/08 | (2006.01) |
| B32B 27/30 | (2006.01) |
| B32B 25/20 | (2006.01) |
| B29C 45/14 | (2006.01) |
| B29K 83/00 | (2006.01) |
| B29K 105/00 | (2006.01) |
| B29L 31/00 | (2006.01) |
| B29L 31/30 | (2006.01) |

(52) U.S. Cl.
CPC .............. *B32B 25/08* (2013.01); *B29C 45/14* (2013.01); *B29C 45/16* (2013.01); *B29C 45/162* (2013.01); *B29C 45/1615* (2013.01); *B32B 25/20* (2013.01); *B32B 27/08* (2013.01); *B32B 27/308* (2013.01); *B29K 2083/00* (2013.01); *B29K 2105/0032* (2013.01); *B29K 2995/0026* (2013.01); *B29L 2031/30* (2013.01); *B29L 2031/7782* (2013.01); *B32B 2250/40* (2013.01); *B32B 2307/412* (2013.01); *B32B 2605/006* (2013.01)

(58) Field of Classification Search
None
See application file for complete search history.

(56) References Cited

U.S. PATENT DOCUMENTS

| | | | | |
|---|---|---|---|---|
| 4,386,042 | A | * 5/1983 | Tatebayashi | ....... B29D 11/0073 264/1.7 |
| 4,874,654 | A | * 10/1989 | Funaki | .................... B29C 45/16 428/192 |

(Continued)

FOREIGN PATENT DOCUMENTS

WO    2012018160 A1    2/2012

*Primary Examiner* — Edmund H Lee
(74) *Attorney, Agent, or Firm* — Vincent Mastrogiacomo; Brooks Kushman P.C.

(57) ABSTRACT

A window including a layer of optically clear structural polymer core and two layers of optically clear silicone applied to first and second sides of the core. A method is disclosed for manufacturing a window that comprises injection molding a layer of optically clear structural polymer and solidifying the structural polymer core. Optically clear silicone is then injected onto the entire surface of both of the first and second sides of the optically clear structural polymer core.

5 Claims, 3 Drawing Sheets

(56) References Cited

U.S. PATENT DOCUMENTS

| | | | | |
|---|---|---|---|---|
| 5,352,532 A * | 10/1994 | Kline | ............ | B29C 45/34 |
| | | | | 428/142 |
| 5,733,659 A * | 3/1998 | Iwakiri | ............ | B29C 45/0005 |
| | | | | 428/412 |
| 6,402,504 B1 | 6/2002 | Hahn et al. | | |
| 7,309,734 B2 | 12/2007 | Vockler | | |
| 7,858,001 B2 * | 12/2010 | Qin | ............ | B32B 27/08 |
| | | | | 264/1.7 |
| 8,236,383 B2 * | 8/2012 | Gasworth | ............ | B29C 45/0053 |
| | | | | 264/129 |
| 8,734,935 B2 | 5/2014 | Striegler | | |
| 2004/0152806 A1 * | 8/2004 | Koga | ............ | C08K 5/103 |
| | | | | 524/115 |
| 2006/0118999 A1 * | 6/2006 | Cooper | ............ | B29C 37/0028 |
| | | | | 264/255 |
| 2008/0157416 A1 * | 7/2008 | Hoult | ............ | B29C 33/424 |
| | | | | 264/39 |
| 2016/0082629 A1 * | 3/2016 | Modi | ............ | B29C 45/1657 |
| | | | | 264/28 |
| 2018/0097156 A1 * | 4/2018 | Leirer | ............ | H01L 33/507 |
| 2019/0031916 A1 * | 1/2019 | Cheng | ............ | C09D 7/63 |

\* cited by examiner

METHOD OF MANUFACTURING A LIGHTWEIGHT VEHICLE WINDOW GLASS ARTICLE

TECHNICAL FIELD

This disclosure relates to polymer window articles and methods of manufacturing such window articles.

BACKGROUND

Automakers are continuing to develop technologies directed to significantly reducing the weight of cars to improve fuel economy and reduce carbon admissions. Glass windows add significantly more weight per square meter of surface area than other types of exterior materials. Glass windows are significantly higher in density than polymer body panels and are considerably thicker than aluminum or steel exterior panels.

Efforts to reduce the thickness of glass windows in vehicles result in increased sound transmission through glazing. Efforts to improve noise, vibration and harshness (NVH) performance by increasing the thickness of glass side panels have the disadvantage of increasing the weight of a vehicle.

Regulatory requirements for vehicle glazing include standards for clarity and resisting scratches for more than 20 years. Glazing products must be able to withstand 20 years of exposure to ultraviolet light and abrasion from the elements and commercial car washes. Glazing products must also avoid the condition known as birefringence that is caused by the refraction of light in two slightly different directions to form two rays of light. One proposed solution to the above problems is to provide a molded polycarbonate glazing with a coating of UV inhibitors and scratch resistant materials or vacuum metalized surface. One disadvantage of polycarbonate glazing with coatings of UV inhibitors and scratch resistant compositions is that they are expensive and lack the durability to meet the long term standards for UV exposure and abrasion.

This disclosure is directed to solving the above problems and other problems as summarized below.

SUMMARY

According to one aspect of this disclosure, a window is provided that includes a layer of optically clear structural polymer, a first layer of optically clear silicone applied to a first side of the optically clear structural polymer, and a second layer of optically clear silicone applied to a second side of the optically clear structural polymer.

The optically clear structural polymer may be polycarbonate, acrylic, or liquid crystal polymer. In one example, the liquid crystal polymer may be cyclo olefin co-polymer.

The optically clear structural polymer may be between 2.0 and 6.0 mm thick, however, in some cases the thickness of the layer may be reduced to 1.5 mm. The first and second layers of optically clear silicone may be between 0.25 and 0.5 mm thick, however, in some cases the thickness of the layer may be up to 2 mm thick. The optically clear silicone may include a translucent colorant to create a desired aesthetic effect.

According to one aspect of this disclosure, a method of manufacturing a window glass article is disclosed. The method includes an initial step of injection molding a layer of optically clear structural polymer. Optically clear silicone is then injection molded onto the entire surface of first and second sides of the layer of optically clear structural polymer.

An alternative aspect of the method may further comprise injecting the optically clear structural polymer in a first mold, solidifying the optically clear structural polymer in the first mold to form a core, and transferring the core to a second mold. Silicone is injected as a liquid to coat first and second sides of the core. The silicone cures to solidify the silicone coatings on both sides of the core. The step of injecting liquid silicone may further comprising injecting a two part liquid polymer including silicone and a platinum catalyst, and holding the mold at a sufficient temperature and pressure to cure the two part liquid polymer.

The method may further comprise injecting liquid silicone into the second mold to coat a first side of the core to form a core with a coating on a single side. As an alternative, the method may comprise transferring the core with the coating on the single side to a third mold and injecting silicone as a liquid to coat a second side of the core to form a core with a coating on a second side.

According to another aspect of this disclosure a method is disclosed for manufacturing a window glass article in a rotational stack/cube molding machine. The method comprises injection molding a layer of optically clear structural polymer in a mold and then injection molding optically clear silicone onto first and second sides of the layer of optically clear structural polymer. The layer of the optically clear structural polymer is cured and solidified before injection molding the optically clear silicone.

This disclosure is directed to solving the above problems and other problems as summarized below.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
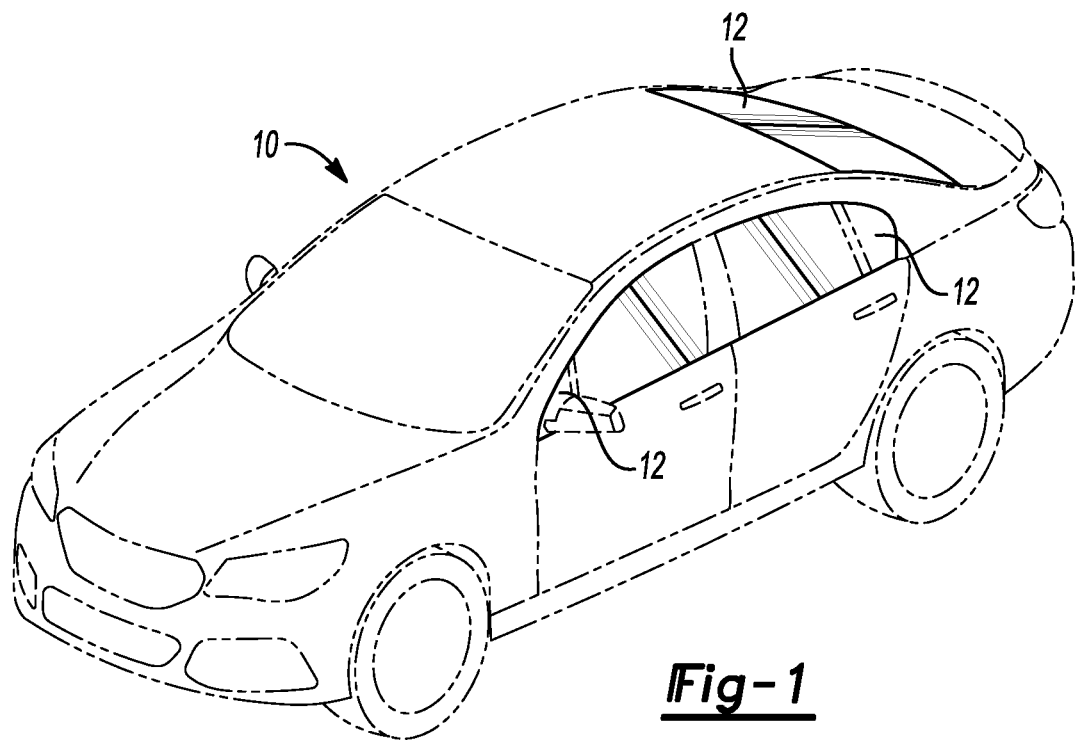
FIG. 1 is a perspective view of a vehicle shown in phantom with windows shown in solid lines.

Referring to FIG. 1, a vehicle 10 is shown in phantom lines with the windows shown in solid lines. Static windows, such as stationary side windows and rear windows, are initially the type of window application to be considered for applying this disclosure and are generally identified by reference numeral 12. Static windows 12 that do not include a wiper or do not rub against a seal as they are raised and lowered are most likely candidates for application of the disclosed technology.

Figure 2:
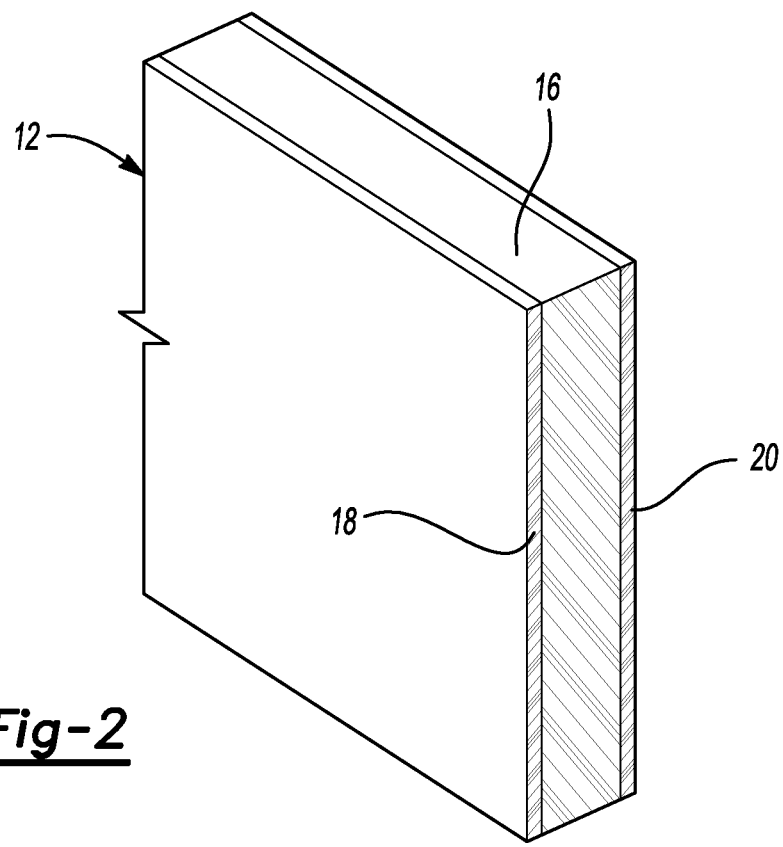
FIG. 2 is a fragmentary perspective view of a window partially in cross section including an optically clear structural polymer core coated with a layer of silicone on first and second sides.

Referring to FIG. 2, the window 12 made according to one embodiment of this disclosure is shown to include an optically clear structural polymer core 16. The optically clear structural polymer core 16 may be formed of polycarbonate, acrylic, or liquid crystal polymer. A first layer of silicone 18 is bonded to one side of the core 16. A second layer of silicone 20 is bonded to an opposite side of the core 16. The first and second layers of silicone 18 and 20 are formed by injecting a two-part liquid polymer including silicone and a platinum catalyst into a mold, as will be described in greater detail below with reference to FIGS. 3-5.

Figure 3:
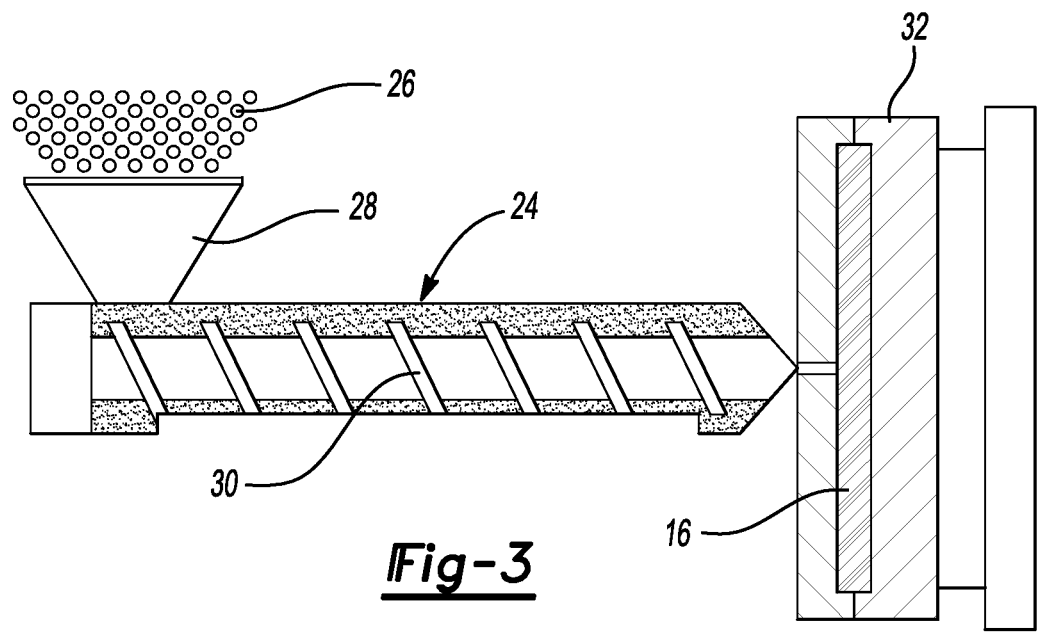
FIG. 3 is a diagrammatic partial cross-section view of an injection molding machine used to form the optically clear structural polymer core.

Referring to FIG. 3, an injection molding machine is generally indicated by reference numeral 24. Pellets of an optically clear structural polymer 26 are supplied to the injection molding machine 24 by a hopper 28. The hopper 28 feeds the pellets 26 to the injection screw 30 of the injection molding machine 24. The pellets 26 melt as they are subjected to heat and pressure and are injected into a core mold 32, that may also be referred to herein as a first mold, to form the core 16. The core 16 may be between 1.5 and 6.0 mm thick.

Figure 4:
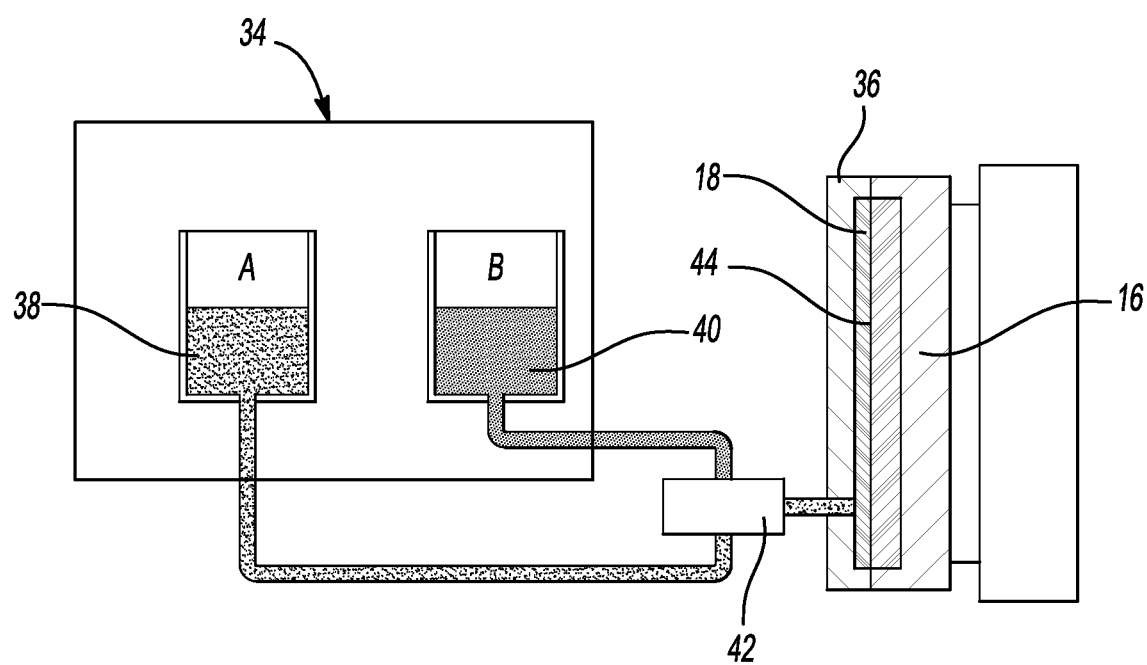
FIG. 4 is a diagrammatic partial cross-section view of an injection molding machine forming a first layer of silicone bonded to a first side of the core.

Referring to FIG. 4, a two-part injection molding machine is generally indicated by reference numeral 34. A first silicone mold 36 is provided with silicone 38 and a platinum catalyst 40. The silicone 38 and platinum catalyst 40 are combined in a mixing head 42 and injected into the silicone mold 36. The silicone/catalyst mixture is injected into the mold 36 to cover the entire first side 44 of the core 16 with the first layer of silicone 18.

Figure 5:
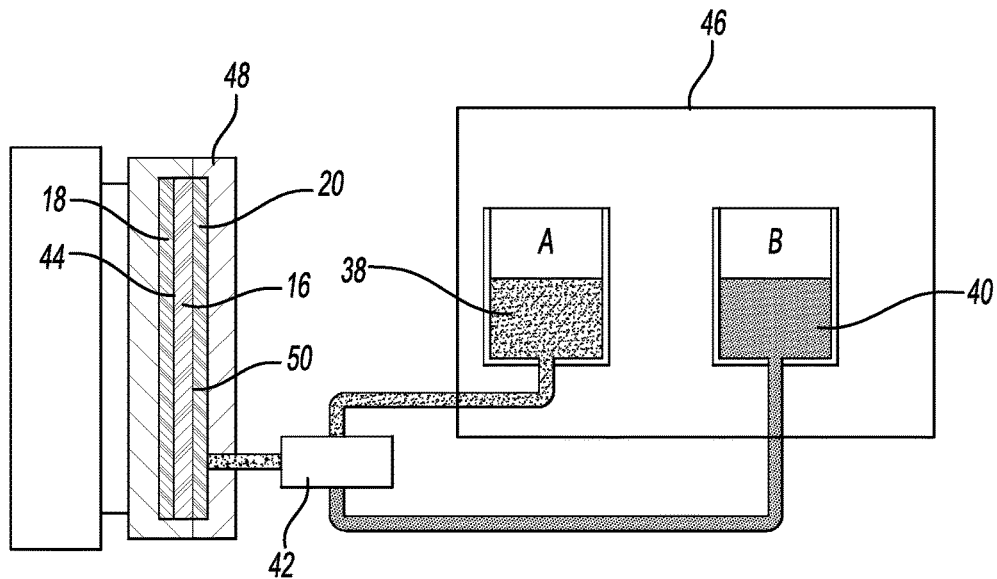
FIG. 5 is a diagrammatic partial cross-section view of an injection molding machine forming a second layer of silicone bonded to a second side of the core.

Referring to FIG. 5, a two-part injection molding machine is generally indicated by reference numeral 34. A second silicone mold 48 is provided with silicone 38 and a platinum catalyst 40. The silicone 38 and platinum catalyst 40 are combined in a mixing head 42 and injected into the silicone mold 48. The silicone/catalyst mixture is injected into the mold 48 to cover the entire second side 50 of the core 16 with the second layer of silicone 20. The silicone layers 18 and 20 may be between 0.25 and 2.0 mm thick.

The injection molding machines 24, 34 and 46 may be transfer mold injection molding machines, rotary transfer molding machines, or rotational stack/cube molding machines. Three transfer mold injection molding machines may be used to make the glazing article, or window, with a first injection molding machine 24 (shown in FIG. 3) injecting the optically clear structural polymer into a mold to form a core or base. The article is transferred to a second transfer mold injection molding machine 34 (as shown in FIG. 4) that injects the silicone thermoset material onto one side of the base. The article is then flipped over as the article is transferred to a third injection molding machine 46 (as shown in FIG. 5) that injects the silicone thermoset material onto a second side of the base.

Alternatively, a rotary transfer molding machine may be utilized that includes three injection molding stations. The core is molded at the first station by a first injection molding machine 24 (shown in FIG. 3). The molded core is then transferred to a second station by a second transfer mold injection molding machine 34 (as shown in FIG. 4) where silicone is molded on one side of the core. After molding silicone on one side of the core, the core with one side coated is flipped over and placed in a third station where a third injection molding machine 46 (as shown in FIG. 5) applies a molded layer of silicone on the other side of the article.

Figure 6:
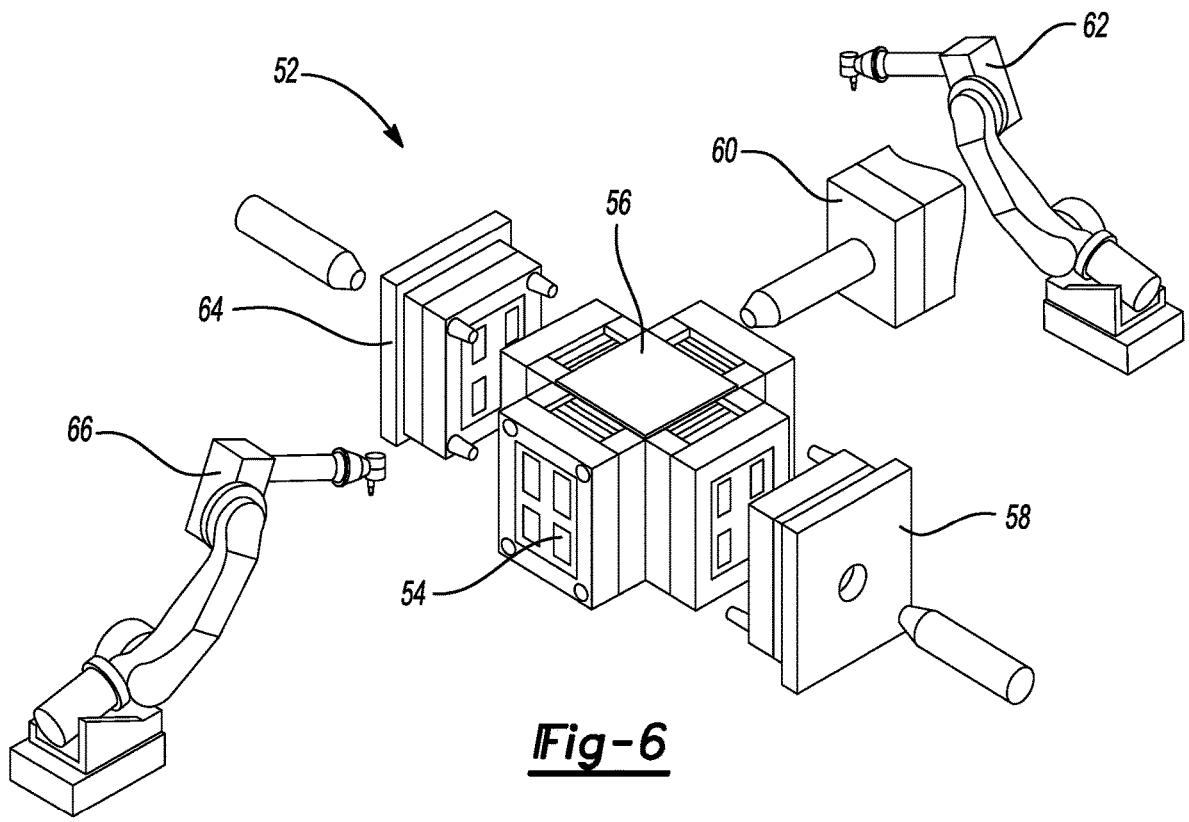
FIG. 6 is a diagrammatic perspective view of a rotational stack/cube molding machine.

As shown in FIG. 6, another alternative is illustrated in which a rotational stack/cube molding machine 52 may be used that includes a plurality of stacked molds 54 on one side of a cube 56 that are injected on one side of the cube 54 at a first injection molding machine 58 to form the optically clear structural polymer core 16. The cube 54 then rotates to a second injection molding machine 60 that injects the first layer of silicone 18 onto one side of the core 16. A robot 62 may be used to flip over one (or a plurality of fixture mounted cores) core 16 with the first layer of silicone coating 38 on one side and place it in the third molding machine 64 to be coated with the second layer of silicone 20 on a second side. The finished window may then be unloaded by a robot 66 at a fourth station.

The optically clear layers of silicone 18 or 20 may include a colorant to tint or color the windows 12 for aesthetics.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A method of manufacturing a lightweight vehicle window glass article comprising:
   injecting an optically clear structural polymer by injection molding in a first injection mold;
   solidifying the optically clear structural polymer in the first mold to form a core layer;
   transferring the core layer to a second injection mold;
   injecting silicone in the second injection mold as a liquid by injection molding to mold first and second sides of the core layer; and
   curing the silicone in the second injection mold to solidify the silicone on the first side and the second side of the core layer to form the lightweight vehicle window glass article.

2. The method of claim 1 wherein the step of injecting silicone further comprises:
   injecting a liquid polymer including silicone and a platinum catalyst.

3. The method of claim 1 wherein the step of curing the silicone to solidify the silicone further comprises:
   holding the second mold at a sufficient temperature and pressure to cure the silicone injected as a liquid.

4. The method of claim 1 further comprising:
   installing the lightweight vehicle window glass article on a vehicle to provide a vehicle window glass article that has less weight per unit of surface area.

5. The method of claim 4 wherein the optically clear silicone on the first side and the second side of the layer of optically clear structural polymer provides resistance for 20 years against UV exposure and abrasion.

* * * * *